US008272302B2

(12) United States Patent
Akiyama

(10) Patent No.: US 8,272,302 B2
(45) Date of Patent: Sep. 25, 2012

(54) PRECISION ROLL TURNING LATHE

(75) Inventor: Takanobu Akiyama, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 900 days.

(21) Appl. No.: 12/260,143

(22) Filed: Oct. 29, 2008

(65) Prior Publication Data

US 2009/0120250 A1 May 14, 2009

(30) Foreign Application Priority Data

Oct. 30, 2007 (JP) ................... 2007-281684
Oct. 30, 2007 (JP) ................... 2007-281702

(51) Int. Cl.
*B23B 21/00* (2006.01)
*B23Q 1/28* (2006.01)
(52) U.S. Cl. .......................................... 82/133; 82/137
(58) Field of Classification Search .............. 82/133, 82/137, 158, 157, 161
See application file for complete search history.

(56) References Cited

U.S. PATENT DOCUMENTS

| 2,777,350 | A | * | 1/1957 | Doll et al. ............. 82/11.5 |
| 2,781,684 | A | * | 2/1957 | Greene et al. ......... 82/11.4 |
| 3,492,897 | A | * | 2/1970 | Mann et al. ........... 82/132 |
| 3,537,340 | A | * | 11/1970 | Westbrook ........... 82/117 |
| 4,184,718 | A | * | 1/1980 | Banach ................. 384/32 |
| 6,186,068 | B1 | * | 2/2001 | Gelbart ................. 101/486 |
| 7,768,159 | B2 | * | 8/2010 | Okada et al. ......... 310/12.24 |
| 2004/0050222 | A1 | | 3/2004 | Sakashita | |

FOREIGN PATENT DOCUMENTS

| CN | 1685167 | 1/2005 |
| JP | 64-20955 | 1/1989 |
| JP | 2004-114238 | 4/2004 |
| JP | 2007-301647 | 11/2007 |
| JP | 2007-301705 | 11/2007 |
| JP | 2007-320022 | 12/2007 |
| JP | 2007-331054 | 12/2007 |
| JP | 2007-331068 | 12/2007 |

(Continued)

OTHER PUBLICATIONS

English language translation of JP-2007-301647.

(Continued)

*Primary Examiner* — Will Fridie, Jr.
(74) *Attorney, Agent, or Firm* — DLA Piper LLP US

(57) ABSTRACT

There is provided a precision roll turning lathe which can perform machining of fine grooves at a dramatically higher speed as compared to conventional roll turning lathes, thus significantly shortening time taken for machining one groove. The precision roll turning lathe includes: a bed; a headstock, mounted on the bed, having a main spindle for rotating a roll as a workpiece while holding one end of the roll by means of a chuck; a tail stock, mounted on the bed and disposed opposite the headstock, for rotatably supporting the other end of the roll; a carriage including a saddle mounted on the bed movably in the longitudinal direction of the roll, and a table mounted on the saddle movably in a direction perpendicular to the longitudinal direction of the roll; and an air slide apparatus, mounted on the table, including a guide rail extending parallel to the roll in the longitudinal direction, an air slider having a diamond tool, capable of traveling in a floating state on the guide rail, and a linear motor for driving the air slider.

11 Claims, 6 Drawing Sheets

FOREIGN PATENT DOCUMENTS

| | | |
|---|---|---|
| TW | 408640 | 10/2000 |
| TW | 533106 | 5/2003 |
| TW | M255084 | 1/2005 |

OTHER PUBLICATIONS

English language translation of JP-2007-301705.
English language translation of JP-2007-320022.
English language translation of JP-2007-331054.
English language translation of JP-2007-331068.
Office Action issued in corresponding Chinese Application No. 200810173984.8 on Feb. 25, 2010.
English Translation of Office Action issued in corresponding Chinese Application No. 200810173984.8 on Feb. 25, 2010.
English Language Abstract of JP 64-02955A, published Jan. 24, 1989.
Taiwanese Office Action issued in TW 97141189 on Jul. 13, 2011.
English Language Translation of Taiwanese Office Action issued in TW 97141189 on Jul. 13, 2011.
English Language Abstract of JP 2004-114238 published on Apr. 15, 2004.
English Language Translation of JP 2004-114238 published on Apr. 15, 2004.
English Language Abstract of CN 1685167 published on Oct. 19, 2005.
English Language Abstract of TW 533106 published on May 21, 2003.

* cited by examiner

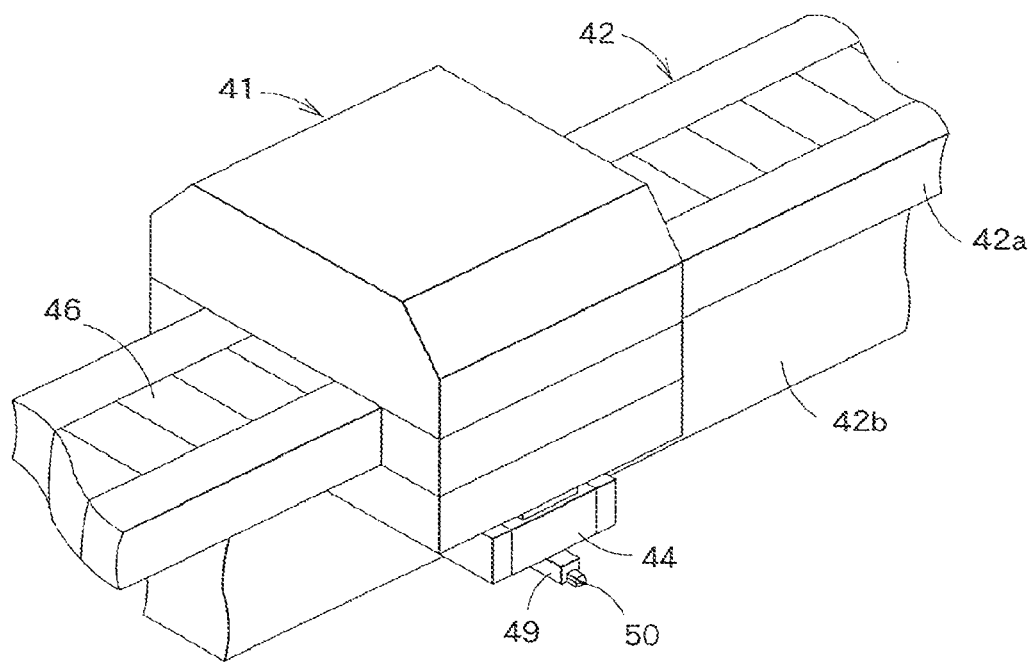
F I G. 4
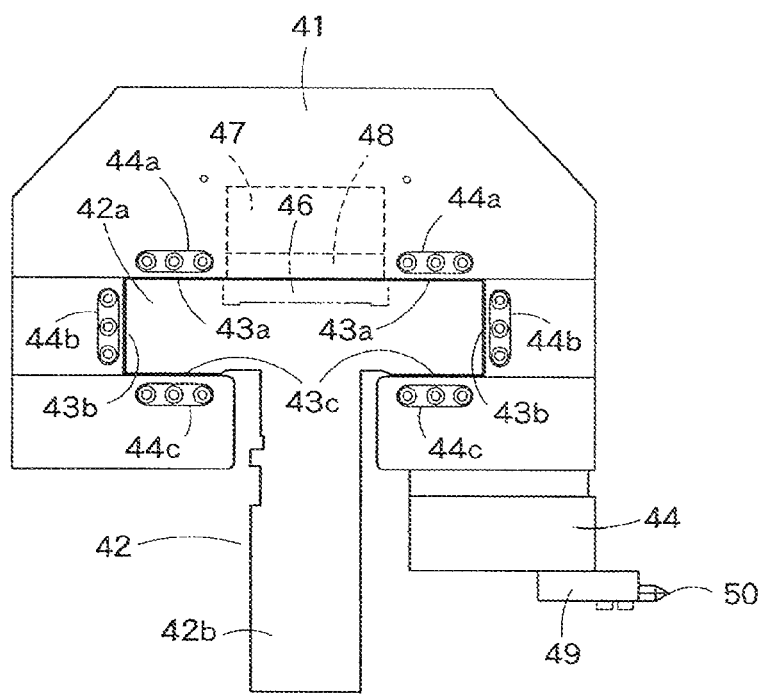
F I G. 5

PRECISION ROLL TURNING LATHE

BACKGROUND OF THE INVENTION

1. Field of the Invention

The present invention relates to a precision roll turning lathe, and more particularly to a precision roll turning lathe for use in machining of a roll mold for extrusion molding of an optical product, such as a lens sheet.

2. Background Art

A roll turning lathe is among machine tools for machining rolls. A roll turning lathe is a lathe in which a tool post, having e.g. diamond tools attached thereto, is mounted in a carriage, and is basically used for machining circumferential grooves in a roll by rotating the roll with a headstock and feeding the carriage in the lateral direction (X-axis direction) of the roll. When machining axial grooves in a roll, the carriage is fed in the longitudinal direction (Z-axis direction) of the roll while indexing the roll with the headstock (C axis), thereby producing the axial grooves.

The recent advancement of machine control technology has realized ultraprecision machining with a roll turning lathe. These days roll turning lathes are used to machine molds for molding of optical lenses. The applicant has proposed precision roll turning lathes which enable such ultraprecision machining (Japanese Patent Application Nos. 2006-130066, 2006-135560, 2006-156388, 2006-165144 and 2006-166404).

These precision roll turning lathes enable machining of ultraprecision roll molds for use in extrusion molding of a lenticular lens sheet, a cross lenticular lens sheet, a prism sheet, etc. which are used in a backlight of a liquid crystal panel. Ultraprecision machining of a roll mold by means of such a roll turning lathe involves the problem that it takes a long time to complete machining of one roll. With the recent progress toward larger-sized liquid crystal displays, roll molds are also becoming larger. For instance, there is a case where a roll mold for a lens sheet, having a length of even two meters, is machined with a roll turning lathe.

No long time is needed to machine one groove in a roll. In the case of the above roll, it takes only about one minute to machine one longitudinal groove in the axial direction. However, it is a characteristic feature of a roll mold for a lens that because of the fineness of one groove, vast numbers of grooves must be machined as a whole. Assuming that 30,000 longitudinal (axial) grooves are to be machined in a roll, it will take about 30,000 minutes, i.e. 500 hours, or 3 weeks to machine all the grooves in the roll without interruptions.

In order to solve the problem, study has been made by the applicant on the use of an air slide apparatus, mounted on a tool post of a roll turning lathe, for high-speed linear movement of a cutting tool in the longitudinal direction of a roll.

When an air slide apparatus is used in precision machining of a roll, how to supply air and electric power to an air slider is a problem. A method, commonly used for an air slider, is to supply air and electric power by means of a cable chain which bends with a movement of the air slider. This method, however, has the drawback that the air slider can vibrate when the cable chain deforms, leading to a lowering of machining precision.

An air slider may vibrate also due to inertia force at the moment the air slider starts to move or comes to a stop or at the moment it changes direction. The vibration will significantly lower machining precision. This also has emerged as a problem to be solved.

SUMMARY OF THE INVENTION

It is therefore an object of the present invention to solve the above problems in the background art and provide a precision roll turning lathe which can perform machining of fine grooves at a dramatically higher speed as compared to conventional roll turning lathes, thus significantly shortening time taken for machining one groove.

It is another object of the present invention to provide a precision roll turning lathe having various functions to prevent vibration of an air slide apparatus, mounted on a tool post, during ultraprecision machining of a roll, and to assist in carrying out roll machining, which has a heavy workload of ultraprecision machining, with higher precision.

In order to achieve the above objects, the present invention provides a precision roll turning lathe comprising: a bed; a headstock, mounted on the bed, having a main spindle for rotating a roll as a workpiece while holding one end of the roll by means of a chuck; a tail stock, mounted on the bed and disposed opposite the headstock, for rotatably supporting the other end of the roll; a carriage including a saddle mounted on the bed movably in the longitudinal direction of the roll, and a tab mounted on the saddle movably in a direction perpendicular to the longitudinal direction of the roll; and an air slide apparatus, mounted on the table, including a guide rail extending parallel to the roll in the longitudinal direction, an air slider having a diamond tool, capable of traveling in a floating state on the guide rail, and a linear motor for driving the air slider.

In a preferred embodiment of the present invention, a swivel, having a tool post with a plurality of cutting tools attached thereto, is mounted on the table, and the air slide apparatus is mounted on the tool post.

The air slide apparatus is preferably provided with a fine machining unit for causing slight displacement of the position of the cutting edge of the diamond tool in a cutting direction by utilizing expansion and contraction of a piezo element upon application of a voltage to the element.

The precision roll turning lathe preferably has an X axis for moving the swivel on the table in a direction perpendicular to the longitudinal direction of the roll to position the air slide apparatus at a machining position, a Z1 axis for moving the saddle in the longitudinal direction of the roll, a Z2 axis for moving the air slider by means of a linear motor, and a B axis as a swivel axis of the swivel.

In a preferred embodiment of the present invention, the precision roll turning lathe further comprises a cutting chip suction apparatus including: a moving table which moves in the same direction as the air slider of the air slide apparatus in synchronization with the air slider; a cutting chip suction section supported by the moving table; and a cable bundle, running along the cutting chip suction section, for supplying air, cooling water and electric power to the air slider.

In a preferred embodiment of the present invention, the precision roll turning lathe further comprises an inertia force correction means for controlling the Z1 and the Z2 axis in such a manner that when the air slider of the air slide apparatus starts to move, comes to a stop or changes direction, the saddle is moved in a direction opposite to the moving direction of the air slider to cancel inertia force produced in the air slider.

The present invention also provides an air slide apparatus for exclusive use in a precision roll turning lathe, said air slide apparatus being mounted on a tool post of a roll turning lathe and linearly moving a cutting tool at a high speed in the longitudinal direction of a roll, and comprising: a guide rail extending parallel to the roll in the longitudinal direction; an air slider having a diamond tool, capable of traveling in a floating state on the guide rail; a linear motor for driving the air slider; and a case integrally housing the guide rail, the air slider and the linear motor.

The precision roll turning lathe of the present invention can perform machining of fine grooves at a dramatically higher speed as compared to conventional roll turning lathes, thus significantly shortening time taken for machining one groove. Further, roll machining, which has a heavy workload of ultraprecision machining, can be carried out with higher precision and higher efficiency.

In addition, the present precision roll turning lathe can have various functions to prevent vibration of the air slide apparatus, mounted on the tool post, during ultraprecision machining of a roll, and to assist in carrying out roll machining with higher precision.

BRIEF DESCRIPTION OF THE DRAWINGS

FIG. 4 is a perspective view showing the air slider and the guide rail of the air slide apparatus of FIG. 3;

FIG. 5 is a side view of the air slider;

DETAILED DESCRIPTION OF THE PREFERRED EMBODIMENTS

Preferred embodiments of the present invention will now be described with reference to the drawings.

First Embodiment

Figure 1:
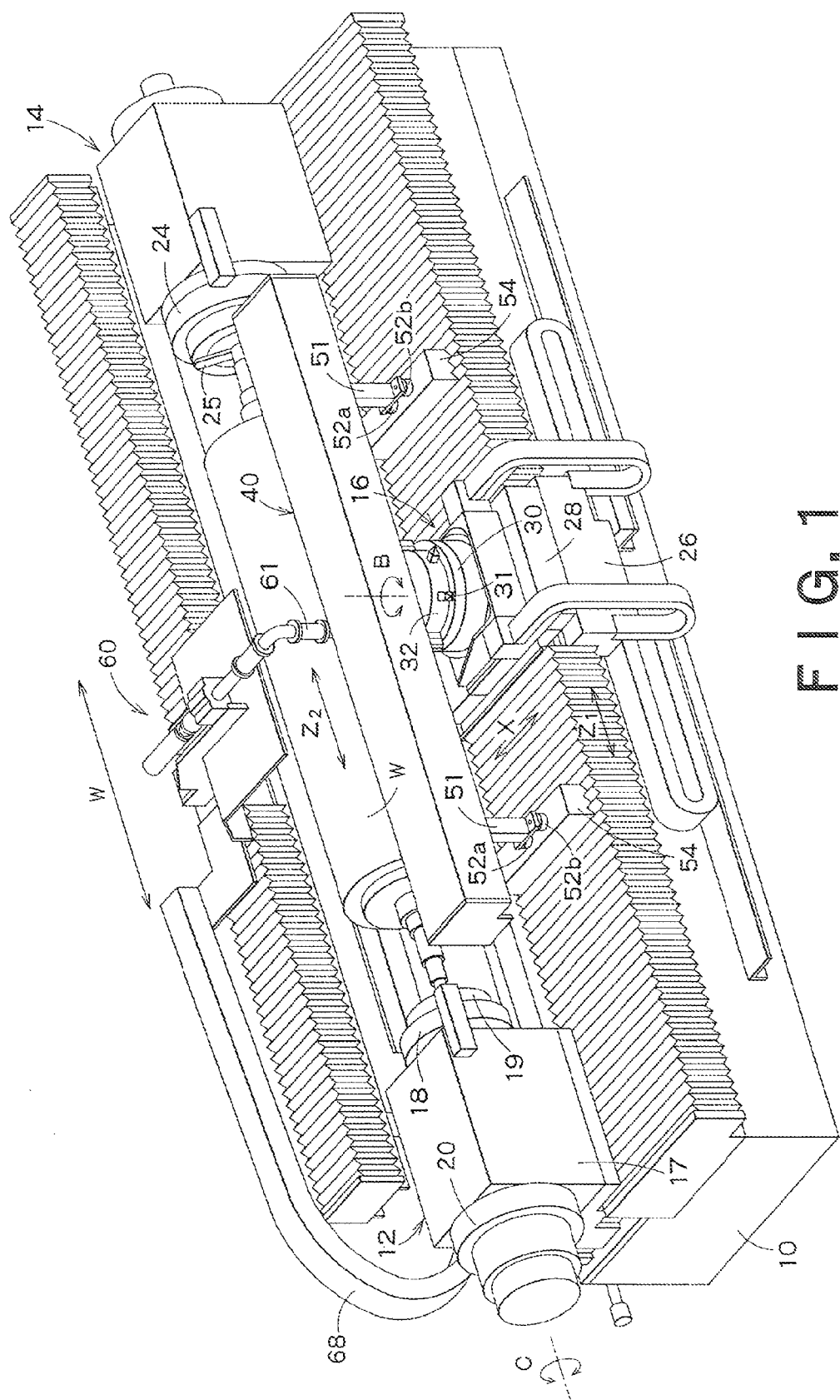
FIG. 1 is a perspective front view of a precision roll turning lathe according to a first embodiment of the present invention.
Figure 2:
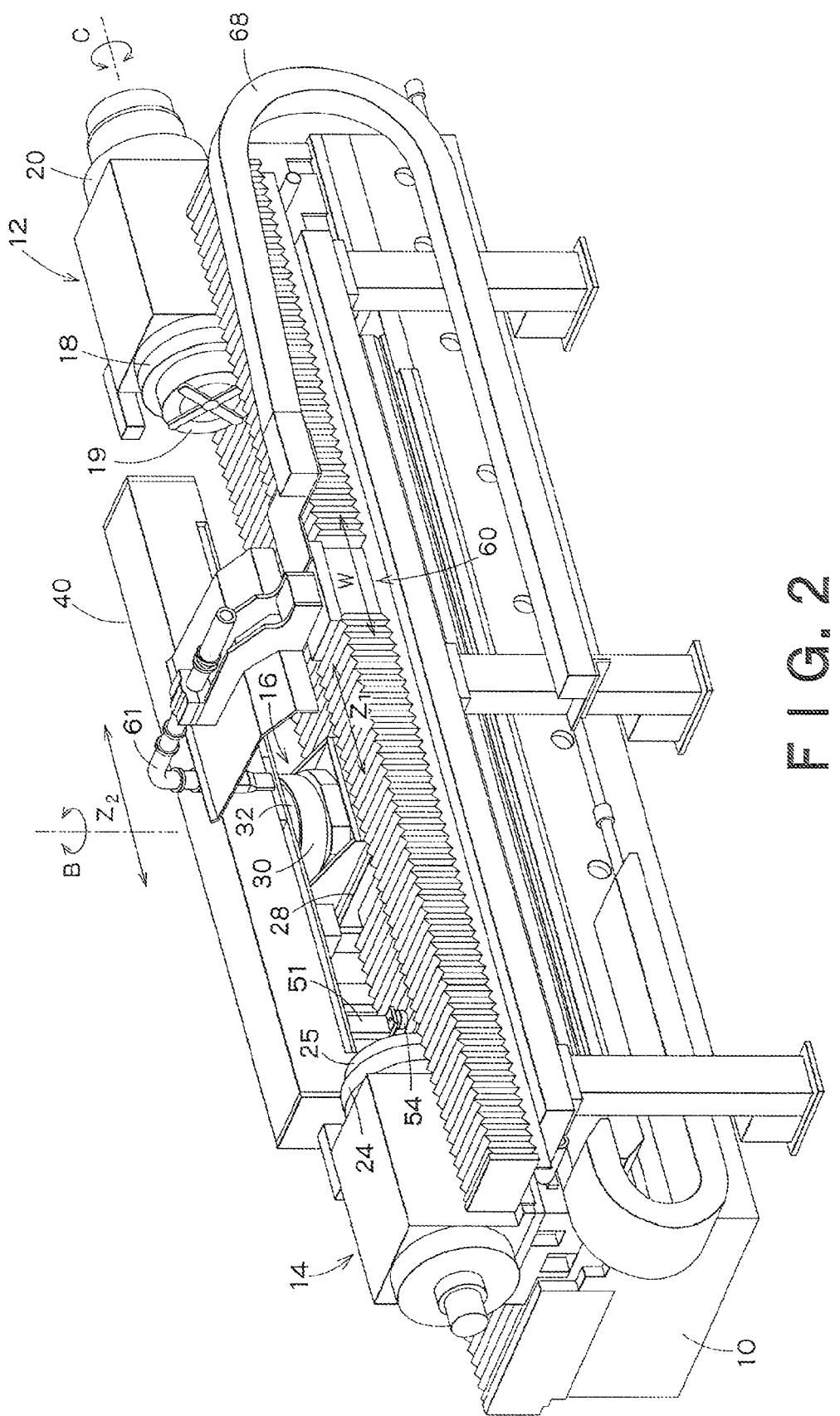
FIG. 2 is a perspective rear view of the precision roll turning lathe according to a first embodiment of the present invention.

FIG. 1 is a perspective front view of a precision roll turning lathe according to a first embodiment of the present invention, and FIG. 2 is a perspective rear view of the precision roll turning lathe without a roll set in it.

In FIGS. 1 and 2, reference numeral 10 denotes a bed. On the bed 10 are mounted a headstock 12, a tail stock 14 and a carriage 16. A roll W as a workpiece is rotatably supported by the headstock 12 and the tail stock 14.

The headstock 12 is disposed on one longitudinal end of the bed 10. The headstock 12 includes a body 17, a main spindle 18, a chuck 19 secured to the front end of the main spindle 18, and a servo motor 20 for driving the main spindle 18. The main spindle 18 is supported by a not-shown hydrostatic oil bearing provided within the body 17. The chuck 19 holds a spindle of the roll W and transmits the rotation of the main spindle 18 to the roll W.

In the headstock 12, the servo motor 20 for driving the main spindle 18 is a built-in servo motor that directly drives the main spindle 18. The revolutions of the main spindle 18 are detected with an encoder. The detection signal of the encoder is fed back to perform position control and speed control of the main spindle 18. The headstock 12 thus can function as an indexing axis (C axis) to perform circumferential indexing of the roll W and can also function to continuously rotate the main spindle 18 at a constant rotating speed (up to several hundred revolutions per minute).

Referring to FIGS. 1 and 2, the tail stock 14 is disposed on the bed 10 and opposite to the headstock 12. A not-shown guide surface is provided on the upper surface of the bed 10 so that the tail stock 14 can be moved along the guide surface. The tail stock 14 has a main spindle 24 instead of a conventional common tail spindle, and rotatably supports a spindle of the roll W by means of a chuck 25 mounted to the main spindle 24. Such a tail stock 14 basically has the same construction as the headstock 12.

A description will now be given of the carriage 16.

The carriage 16 includes a saddle 26 mounted on the bed 10 movably in the axial direction of the roll W. On the saddle 26 is mounted a table 28 movably in a direction perpendicular to the axial direction of the roll W.

In the precision roll turning lathe of this embodiment, the axis along which the saddle 26 is fed is termed Z1 axis, and the axis along which the table 28 is fed on the saddle 26 is termed X axis. In addition to the X axis and the Z1 axis, the headstock 12 has the C axis and a tool swivel 30, mounted on the table 28, has a B axis. The precision roll turning lathe also has a Z2 axis and a W axis as will be described later in detail.

A tool post 32 is mounted on the tool swivel 30. In this embodiment besides ordinary cutting tools 31, an air side apparatus 40 as an attachment can be attached to and removed from the tool post 32.

The cutting tools 31 are arranged circumferentially at predetermined intervals in the tool post 32. In this embodiment four cutting tools 31 are provided in the tool post 32, and each tool 31 can be indexed by swiveling the tool post 32 by 60 degrees. In the case of ultraprecision machining, diamond tools are used as the cutting tools 31.

In the precision roll turning of lather of this embodiment, the tool post 32 is provided with the following air slide apparatus 40.

Figure 3:
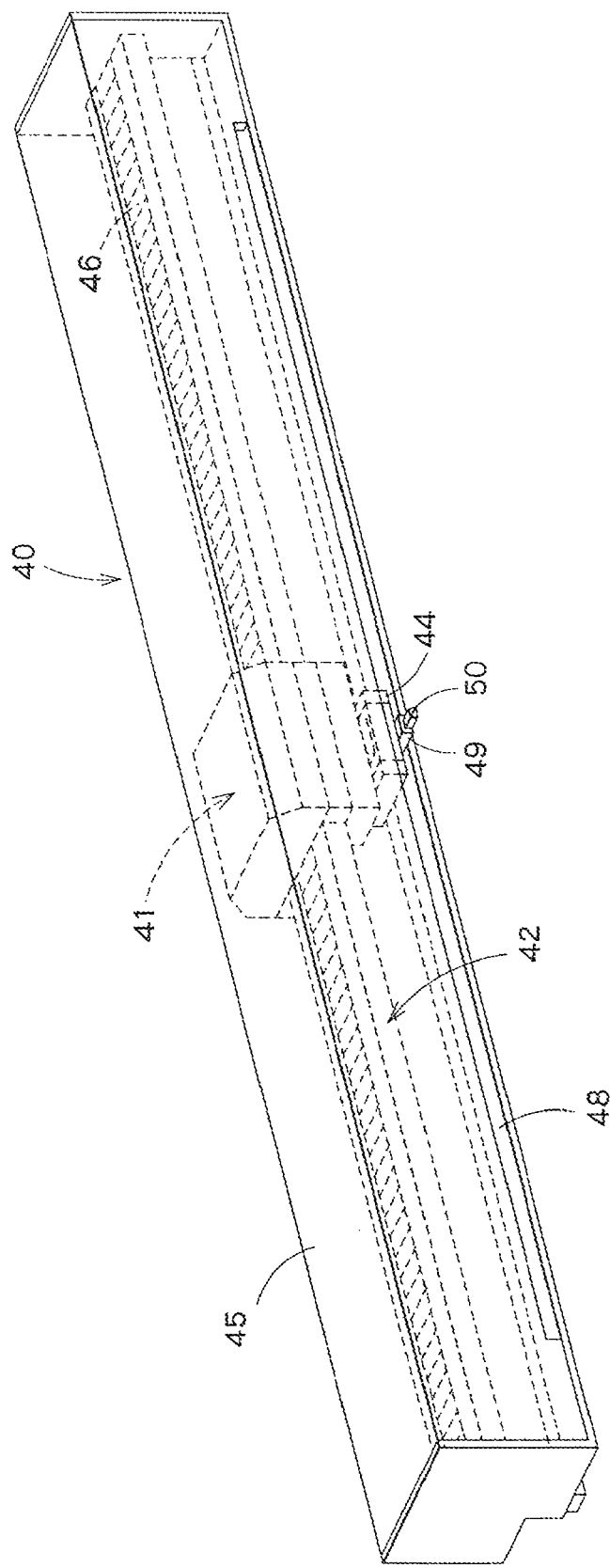
FIG. 3 is a perspective view showing the external appearance of an air slide apparatus for use in the precision roll turning lathe according to a first embodiment of the present invention.

FIG. 3 is a perspective view showing the main body of the air slide apparatus 40. The air slide apparatus 40 is mounted as an attachment to the tool post 32 in order to linearly move a diamond tool at a high speed in the longitudinal direction of the roll W and machine axial grooves with high efficiency.

The air slide apparatus 40 of this embodiment drives an air slider 41 by means of a linear motor, so that the air slider 41 travels in a floating state at a high speed along a guide rail 42. A diamond tool 50 is attached via a fine machining unit 44 to the air slider 41. The air slider 41 travels inside a case 45 and the diamond tool 50 moves while it keeps projecting from a slit formed in the case 45. The air slide apparatus 40 is thus housed and unitized in the long boxy case 45 and, together with the case 45, can be attached to or removed from the tool post 32. When the air slide apparatus 40 is not mounted on the tool post 32, the tool post 32 can perform machining with the cutting tools 31 as an ordinary tool post.

FIG. 4 shows the air slider 41 and the guide rail 42 of the air slide apparatus 40, with the case 45 being removed.

The guide rail 42, which is so positioned as to become parallel to the roll W, has a long length of e.g. about 2 to 3 meters in the case of a large-sized roll turning lathe so that a large-sized long roll W can be machined. It is, of course, possible to use a short rail when machining a short roll. The guide rail 42 has a T-shaped cross section: its horizontal portion 42a intersects with its vertical portion 42b at a right angle. The air slider 41 is fit on the horizontal portion 42a as if the former embraces the latter. Magnets 46 which constitute the stator of the linear motor, are arranged centrally in the upper surface of the horizontal portion 42a of the guide rail 42 in the longitudinal direction of the rail.

As shown in FIG. 5, sliding surfaces 43a, 43b, 43c for the air slider 41 are formed in the upper, lower and side surfaces of the horizontal portion 42a of the guide rail 42. The air slider 41 is provided with hydrostatic air bearings 44a, 44b, 44c. Air is jetted from the hydrostatic air bearings 44a, 44b, 44c toward the sliding surfaces 43a, 43b, 43c, so that the air slider 41 floats slightly above the sliding surfaces 43a, 43b, 43c with a bearing gap formed therebetween. The mover 48 of the linear motor is carried on a cooling block 47 and disposed in the bottom of the air slider 41 such that it faces the magnets 46. Cooling water is supplied to the cooling block 47 to prevent overheat of the mover 48. The linear motor constitutes a Z2-axis drive mechanism for moving the air slider 41 and controlling the position and the speed of the air slider 41.

As shown in FIG. 5, a tool holder 49 is mounted via the fine machining unit 44 to the air slider 41 at a position below the roll W-facing side surface of the air slider 41. The diamond tool 50 is secured to the tool holder 49.

The fine machining unit 44 is a device for causing slight displacement of the position of the cutting edge of the diamond tool 50 in a cutting direction by utilizing slight deformation of a piezo element upon application of a voltage to the element. Upon machining of the roll W, the cutting edge of the diamond tool 50 lies on the X-Y plane including the axis of the roll W. After rough positioning the cutting edge in the vicinity of the roll W by moving the cutting tool 50 with the X axis, a predetermined voltage is applied to the piezo element in the fine machining unit 44 to expand the piezo element. This enables setting of a cutting depth of the diamond tool 50.

Figure 6:
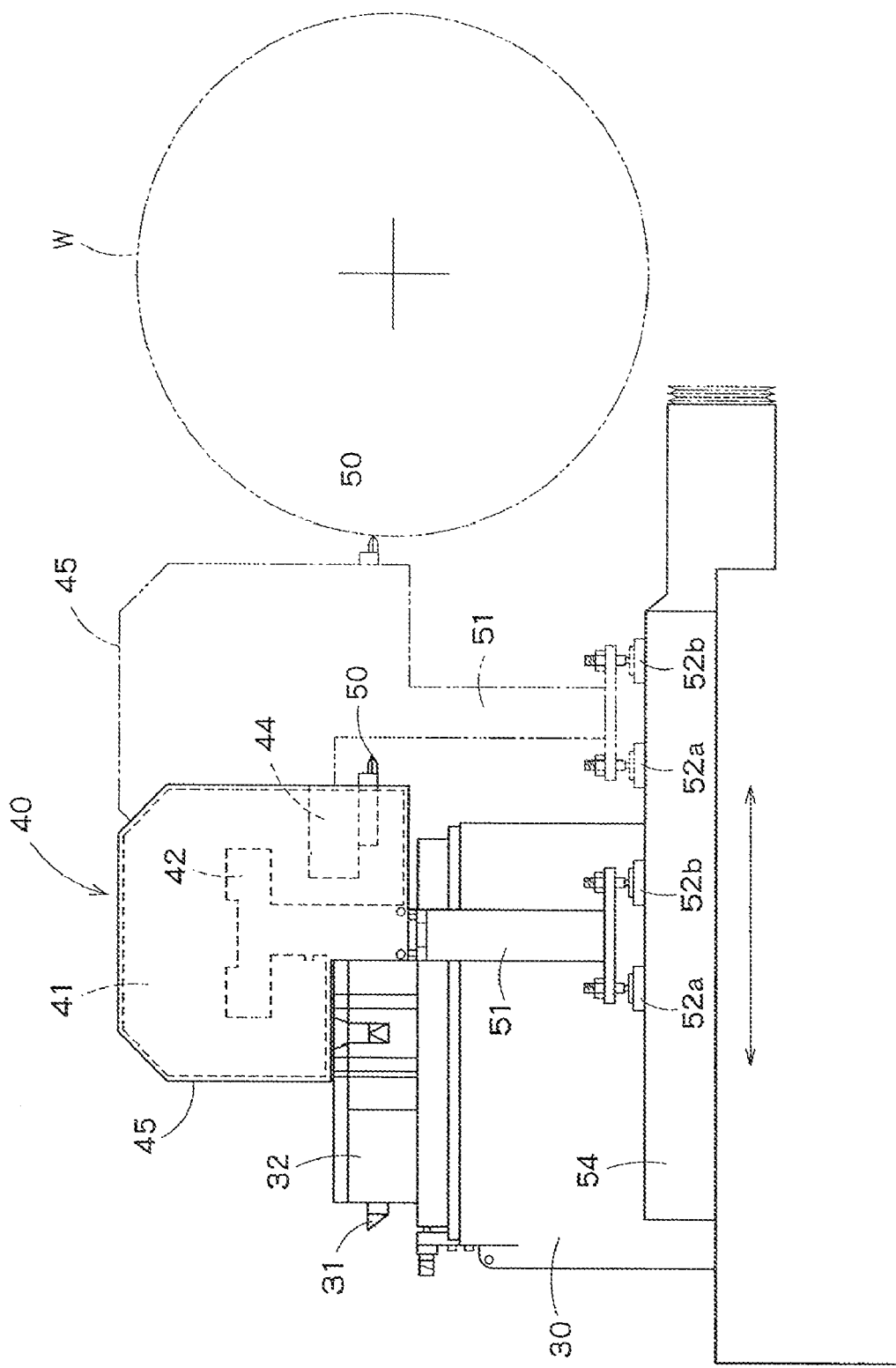
FIG. 6 is a side view of the precision roll turning lathe, illustrating positioning of the air slide apparatus with respect to a roll.

The complete set of components of the above-described air slide apparatus 40 is housed in the case 45, and the air slide apparatus 40, together with the case 45, is mounted on the tool post 32 when it is used, with both ends of the case 45 being supported in the following manner:

Referring to FIGS. 1 and 6, legs 51 are mounted to the case 45 at positions near its ends. Air pads 52a, 52b are mounted to the lower end of each leg 51. The air pads 52a, 52b are formed of a porous material, so that by vacuuming through the fine pores, the air pads 52a, 52b can be fixed to rests 54 disposed on the bed 10. When moving the air slide apparatus 40 in the X-axis direction together with the tool post 32, the air pads 52a, 52b can be floated slightly above the surfaces of the rests 54 by jetting air from the air pads.

In FIGS. 1 and 2, reference numeral 60 denotes a cutting chip suction apparatus. The cutting chip suction apparatus 60 has, as a control axis, a W axis which is synchronized with the Z2 axis of the air slide apparatus 40. A suction inlet 61 is disposed near the diamond tool 50 of the air slider 41.

The operation of the thus-constructed precision roll turning lathe according to the first embodiment will now be described.

The precision roll turning lathe of the first embodiment can be used either with the air slide apparatus 40 mounted on the tool post 32 or without the use of the air slide apparatus 40, i.e. as a common roll turning lathe, to machine the roll W. A description will be first made of the case of machining axial grooves in the roll with the use of the air slide apparatus 40.

Prior to machining, centering of the roll W is performed when mounting it to the headstock 12 and the tail stock 14. Next, the air slide apparatus 40, mounted on the tool post 32, is indexed with the B axis so that it becomes parallel to the roll W. Thereafter, the tool swivel 30, together with the table 28, is fed with the X axis so as to position the cutting edge of the diamond tool 50 at a position at a distance of nearly zero from the roll W.

Referring to FIG. 6, while the air slide apparatus 40 is moving to the above position, air is continually jetted from the air pads 52a, 52b of the legs 51 whereby the air pads 52a, 52b are kept in a floating state slightly above the surfaces of the rests 54. After the X-axis positioning of the air slide apparatus 40 (shown by the two-dot chain lines), the air pads 52a, 52b are attracted to the rests 54 through vacuuming of the pads, whereby the air slide apparatus 40 can be clamped. The movement and the clamping of the air slide apparatus 40 on the rests 54 can be performed smoothly by using air pads 52a, 52b in this manner.

When the air slide apparatus 40 is thus clamped, the distance between the cutting edge of the diamond tool 50 and the roll W is nearly 0. Subsequently, in order to create a machining datum surface in the entire surface area of the roll W to be machined, machining of the entire surface is carried out by feeding the air slider 41 with the Z2 axis while rotating the roll W. The entire surface machining establishes a datum for machining. Ultraprecision machining with the diamond tool 50 is subsequently carried out.

The main ultraprecision machining will now be described taking as an example the case of machining fine axial grooves over the entire surface of the roll W. In this case, fine grooves are machined one by one in the roll W by moving the air slider 41 at a high speed. Upon completion of machining of one groove, the roll W is indexed with the C axis, and the air slider 41 is moved to machine the next groove in the roll W. This operation is repeated to machine grooves in the entire surface of the roll W.

In the case of machining fine axial grooves all over the roll W, in addition to the broad machining area, the number of the grooves is enormous.

The precision turning lathe of this embodiment can perform such laborious machining with increased efficiency, as described below.

First of all, the present precision roll turning lathe which, in addition to the Z1 axis for feeding the carriage 16 carrying the tool post 32, is provided with the air slide apparatus 40, constituting the Z2 axis, can make full use of the high speed of the air slide apparatus 40. In particular, the air slide apparatus 40, constituting the Z2 axis, can machine a groove while allowing the air slider 41, having the diamond tool 50, to travel at a high speed. This manner of machining can feed a cutting tool at a significantly higher speed as compared to the conventional manner of roll machining in which the carriage 16 carrying the tool post 32 is fed to machine a groove.

In fact, even a fast carriage of a conventional roll turning lathe can travel at a speed of about 15 m/min at the most, whereas the air slider 41 of the air slide apparatus 40 can travel at 45 m/min, which is three times the former speed.

Not merely the high speed performance, the air slide apparatus 40, by floating the air slider 41 by means of air bearings and linearly moving the air slider 41 by linear motor drive, has the advantages of high straightness of movement, no friction and high-precision control of position and speed.

Secondly, when machining fine grooves in the roll W, it is necessary to carry out cutting with a diamond tool several times to finish one groove. In this regard, it is conventional practice to change the position of a cutting edge and, in addition, adjust the cutting depth with the X axis.

According to the roll turning lathe of this embodiment, in which the air slider 41 is provided with the fine machining unit 44 and the diamond tool 50 is attached via the fine machining unit 44 to the air slider 41, the cutting depth of the diamond tool 50 can be finely controlled by a voltage applied to the piezo element. Thus, once the initial X-axis position of the cutting edge of the diamond tool 50 is determined, the position of the cutting edge can be later displaced slightly by means of the fine machining unit 44. A groove can therefore be machined with higher precision. Furthermore, because of no need for slight movement with the X axis, the efficiency of machining can be dramatically increased.

The roll turning lathe of this embodiment thus makes it possible to carry out ultraprecision machining of axial grooves in the entire surface of the roll W with significantly increased efficiency as compared to conventional roll turning lathes. In fact, it has been confirmed that tens of thousands of grooves can be machined in a large-sized roll in about two weeks by using the roll turning lathe of this embodiment, while it generally takes from three weeks to one month for a conventional roll turning lathe to complete such machining.

While machining of axial grooves in the roll W has been described, it is of course possible to machine fine circumferential grooves in the roll W by using the air slide apparatus 40. In the case of circumferential grooves, the air slider 41 is fed a slight distance in the axial direction after machining of each groove.

It is, of course, possible to carry out machining of a roll using the precision roll turning lathe of this embodiment in which the air slide apparatus 40 is removed from the tool post 32, that is, carry out machining of a roll in the conventional manner using the cutting tool 31 of the tool post 32.

While the precision roll turning lathe of the present invention has been described with reference to the embodiment in which the roll turning lathe optionally has the Z2 axis by attaching the air slide apparatus to the lathe, it is also possible to provide the Z2 axis to the roll turning lathe in a fixed manner, i.e. by fixing the air slide apparatus in the lathe.

Second Embodiment

A precision roll turning lathe according to a second embodiment of the present invention will now be described with reference to FIG. 7.

Figure 7:
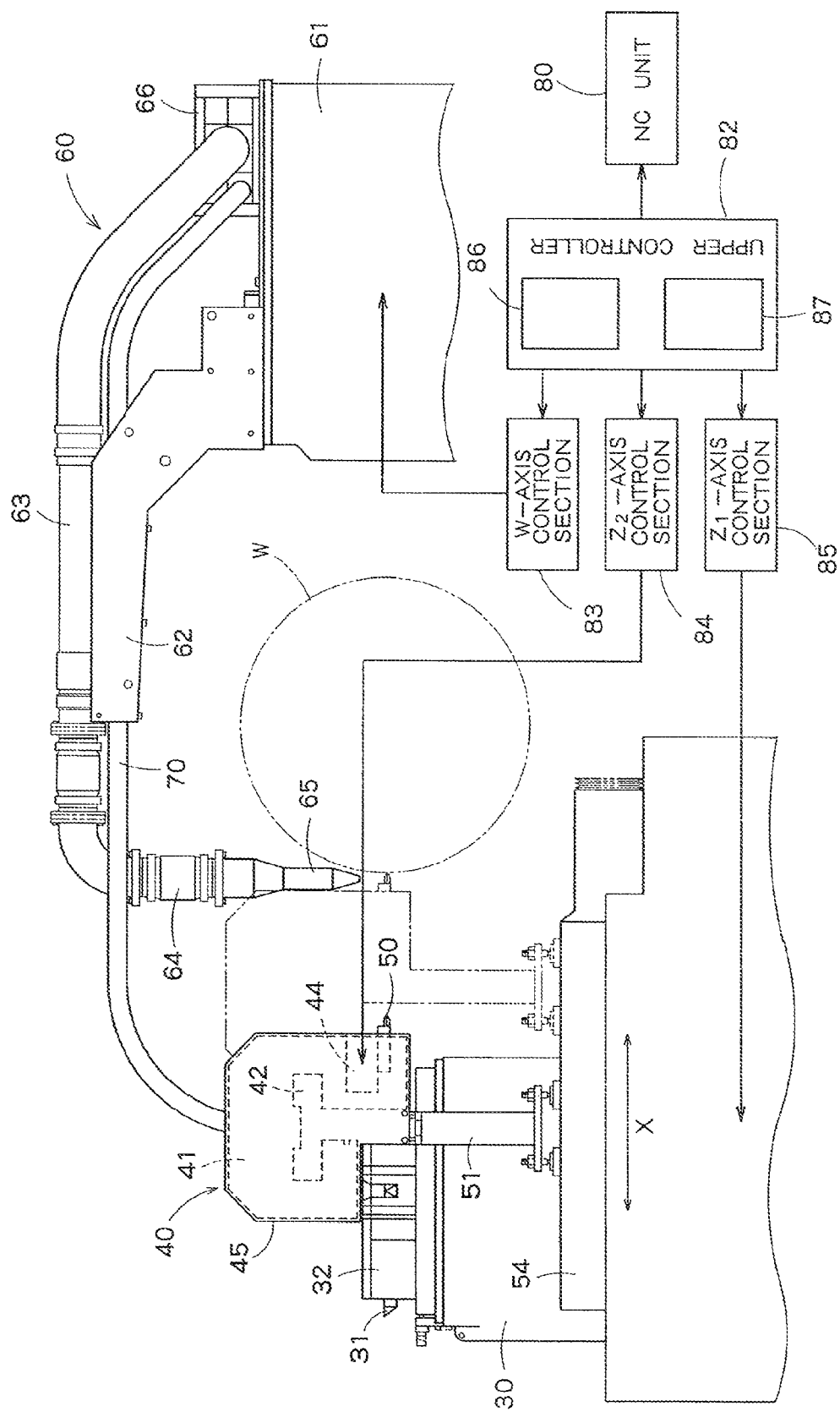
FIG. 7 is a side view of a cutting chip suction apparatus connected to an air slide apparatus for use in a precision roll turning according to a second embodiment of the present invention.

The roll turning lathe of this embodiment is characterized by the provision of the cutting chip suction apparatus 60 shown in FIG. 7. As shown in FIG. 7, the cutting chip suction apparatus 60 includes a moving table 61 and a support arm 62. The moving table 61 moves on the bed 10 in a direction parallel to the moving direction of the air slider 41. A ball screw is employed as a drive mechanism for the moving table 61 with a W axis as its control axis.

The support arm 62 is fixed on the moving table 61, and the support arm 62 extends toward the roll W. A suction pipe 63 is supported by the support arm 62. A joint 64 is mounted to the downwardly-bent end of the suction pipe 63, and a suction nozzle 65 is connected via the joint 64 to the suction pipe 63. The front end of the suction nozzle 65 is to be positioned close to the diamond tool 50.

The terminal of the suction pipe 63 is connected to a terminal connector 66 which is connected to a cable chain 68 (see FIG. 1) that bends with movement of the moving table 61. The cable chain 68 contains cables and pipes respectively for supplying electric power and cooling water to the moving table 61 and the air slide apparatus 40, an air pipe for supplying air to the air slide apparatus 40, and a vacuuming pipe for vacuuming the suction pipe 63.

In this embodiment a flexible cable bundle 70, consisting of cables and pipes for supplying air, cooling water and electric power to the air slider 41 of the air slide apparatus 40, is mounted along the suction pipe 63 and connected to the air slider 41.

In FIG. 7, reference numeral 80 denotes an NC unit. The NC unit 80 numerically controls the X, Z1, Z2, B, C and W axes.

With respect to the Z1 axis for controlling the movement of the saddle 26, the Z2 axis for controlling the air slide apparatus 40 and the W axis for controlling the cutting chip suction apparatus 60, the roll turning lathe of this embodiment has the following control functions imparted by a host controller 82.

First, a synchronization control section 86 which controls a W-axis control section 83 and a Z2-axis control section 84 so that they operate in synchronization is installed as a software on the host controller 82.

Further, with respect to the Z1 axis and the Z2 axis, an inertia force correction section 87 which controls a Z1-axis control section 85 and the Z2-axis control section 84 in such a manner that when the air slider 41 of the air slide apparatus 40 starts to move, comes to a stop or changes direction, the saddle 26 is moved in a direction opposite to the moving direction of the air slider 41 to cancel inertia force produced in the air slider 41, is installed on the host controller 82.

The precision turning lathe of this embodiment can perform laborious roll machining with increased efficiency, as described below.

First of all, the present precision roll turning lathe which, in addition to the Z1 axis for feeding the carriage 16 carrying the tool post 32, is provided with the air slide apparatus 40, constituting the Z2 axis, can make full use of the high speed of the air slide apparatus 40. In particular, the air slide apparatus 40, constituting the Z2 axis, can machine a groove while allowing the air slider 41, having the diamond tool 50, to travel at a high speed. This manner of machining can feed a cutting tool at a significantly higher speed as compared to the conventional manner of roll machining in which the carriage 16 carrying the tool post 32 is fed to machine a groove.

In fact, even a fast carriage of a conventional roll turning lathe can travel at a speed of about 15 m/min at the most, whereas the air slider 41 of the air slide apparatus 40 can travel at 45 m/min, which is three times the former speed.

Not merely the high speed performance, the air slide apparatus 40, by linearly moving the air slider 41 in a floating state, has the advantages of high straightness of movement, no friction and high-precision control of position and speed.

In order to move the air slider 41 of such air slide apparatus 40 at a high speed, it is necessary to feed electricity to the linear motor and continually supply air and cooling water to the air slider 41 during machining.

In this regard, in this embodiment the cable bundle 70, consisting of a cable for supplying electric power to the air slide apparatus 40, a cooling water pipe and an air pipe, is run along the cutting chip suction pipe 36 and connected to the air slider 41. In addition, the W axis of the cutting chip suction apparatus 60 synchronizes with the Z2 axis of the air slide apparatus 40. Thus, the suction nozzle 65 of the cutting chip suction apparatus 60 moves with the movement of the air slider 41, so that cutting chips produced by machining are sucked in and removed. This can prevent chip troubles, such as adhesion of cutting chips to the guide rail of the air slider 41.

Furthermore, because the cable bundle 70 also moves in synchronization with the movement of the air slider 41, there is no need to connect it to a cable chain that bends with the movement of the air slider 41. The air slider 41 during machining is therefore free from vibration which would be caused by flexure of a cable. This makes it possible to make best use of the merits of the air slide apparatus 40, in particular the straightness of movement and the high speed.

As regards vibration that may occur in the air slide apparatus 40, the air slider 41 can also vibrate due to inertia force when it starts to move, comes to a stop or changes direction. In this regard, as described above, the roll turning lathe of this embodiment is provided with the function of canceling inertia force, produced in the air slider 41, by moving the saddle 26 in a direction opposite to the moving direction of the air slider 41. The occurrence of vibration in the air slider 41 can therefore be effectively prevented.

For example, when the air slider 41 starts to move, inertia reaction force, equal to "acceleration×mass" of the air slider 41, will act on the tool post 32. The reaction force will cause vibration of the air slider 41.

In this embodiment, therefore, the inertia force produced in the air slider 41 is canceled by producing inertia force, which is the same in degree as the inertia force produced in the air slider 41 but opposite in direction thereto, in the saddle 26. Thus, the both inertia forces cancel each other by moving the saddle 26 in a direction opposite to the moving direction of the air slider 41 at such an acceleration as to make the "acceleration×mass" of the entire carriage 16 equal to the "acceleration×mass" of the air slider 41.

The inertia force-canceling operation of the saddle 26 makes it possible to make best use of the merits of the air slide apparatus 40, in particular the straightness of movement and the high speed.

What is claimed is:

1. A precision roll turning lathe comprising:
    a bed;
    a headstock, mounted on the bed, having a main spindle for rotating a roll as a workpiece while holding one end of the roll by means of a chuck;
    a tail stock, mounted on the bed and disposed opposite the headstock, for rotatably supporting the other end of the roll;
    a carriage including a saddle mounted on the bed movably in the longitudinal direction of the roll, and a table mounted on the saddle movably in a direction perpendicular to the longitudinal direction of the roll; and
    an air slide apparatus, mounted on the table, including a guide rail extending parallel to the roll in the longitudinal direction, an air slider having a diamond tool, capable of traveling in a floating state on the guide rail, and a linear motor for driving the air slider.

2. The precision roll turning lathe according to claim 1, wherein a swivel, having a tool post with a plurality of cutting tools attached thereto, is mounted on the table, and the air slide apparatus is mounted on the tool post.

3. The precision roll turning lathe according to claim 1, wherein the air slide apparatus is provided with a fine machining unit for causing slight displacement of the position of the cutting edge of the diamond tool in a cutting direction by utilizing expansion and contraction of a piezo element upon application of a voltage to the element.

4. The precision roll turning lathe according to claim 2, wherein the lathe has an X axis for moving the swivel on the table in a direction perpendicular to the longitudinal direction of the roll to position the air slide apparatus at a machining position, a Z1 axis for moving the saddle in the longitudinal direction of the roll, a Z2 axis for moving the air slider by means of a linear motor, and a B axis as a swivel axis of the swivel.

5. The precision roll turning lathe according to claim 2, wherein the air slide apparatus is constructed as an attachment that can be attached to and removed from the tool post.

6. The precision roll turning lathe according to claim 1, further comprising a cutting chip suction apparatus including:
    a moving table which moves in the same direction as the air slider of the air slide apparatus in synchronization with the air slider;
    a cutting chip suction section supported by the moving table; and
    a cable bundle, running along the cutting chip suction section, for supplying air, cooling water and electric power to the air slider.

7. The precision roll turning lathe according to claim 4, further comprising an inertia force correction means for controlling the Z1 and the Z2 axis in such a manner that when the air slider of the air slide apparatus starts to move, comes to a stop or changes direction, the saddle is moved in a direction opposite to the moving direction of the air slider to cancel inertia force produced in the air slider.

8. An air slide apparatus for exclusive use in a precision roll turning lathe, said air slide apparatus being mounted on a tool post of a roll turning lathe and linearly moving a cutting tool at a high speed in the longitudinal direction of a roll, and comprising:
    a guide rail extending parallel to the roll in the longitudinal direction;
    an air slider having a diamond tool, capable of traveling in a floating state on the guide rail;
    a linear motor for driving the air slider; and
    a case integrally housing the guide rail, the air slider, and the linear motor;
    wherein the guide rail has a horizontal portion on which the air slider is fit and a vertical portion, and has a T-shaped cross section in which the horizontal portion intersects with the vertical portion at a right angle; and
    wherein magnets of the linear motor are arranged centrally in the upper surface of the horizontal portion in the longitudinal direction of the guide rail, and sliding surfaces on which the air slider moves in a floating state are formed on both sides of the magnet series.

9. The air slide apparatus according to claim 8, further comprising:
    legs, mounted to the case, for supporting the air slide apparatus, in a horizontal position; and
    rests for slidably supporting the legs.

10. The sir slide apparatus according to claim 9, wherein air pads for jetting and sucking in air are mounted to the lower ends of the legs so that by jetting air from the air pads, the air slide apparatus can float on the surfaces of the rests and, by vacuuming the air pads, the air slide apparatus can be fixed on the rests at an arbitrary position.

11. The air slide apparatus according to claim 8, further comprising a fine machining means for causing slight displacement of the position of the cutting edge of the diamond tool in a cutting direction by utilizing expansion and contraction of a piezo element upon application of a voltage to the element.

* * * * *